(12) United States Patent
Shiokawa et al.

(10) Patent No.: US 7,782,500 B2
(45) Date of Patent: Aug. 24, 2010

(54) IMAGE READING APPARATUS AND COPYING APPARATUS

(75) Inventors: Tsuyoshi Shiokawa, Hachioji (JP); Mitsuru Nagoshi, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 1043 days.

(21) Appl. No.: 11/505,540

(22) Filed: Aug. 16, 2006

(65) Prior Publication Data

US 2007/0053017 A1 Mar. 8, 2007

(30) Foreign Application Priority Data

Sep. 8, 2005 (JP) ............................. 2005-260423

(51) Int. Cl.
*H04N 1/00* (2006.01)
*H04N 1/04* (2006.01)

(52) U.S. Cl. .................. 358/474; 358/408; 358/496

(58) Field of Classification Search .......... 358/1.2, 358/505, 521, 408, 471, 474, 475, 494, 496, 358/497, 300, 302; 382/312, 319, 318; 399/144, 399/363, 365, 368, 379
See application file for complete search history.

(56) References Cited

U.S. PATENT DOCUMENTS

| 6,323,933 | B1 * | 11/2001 | Anzai | 355/23 |
|---|---|---|---|---|
| 6,538,718 | B2 * | 3/2003 | Ando et al. | 355/50 |
| 7,031,515 | B2 * | 4/2006 | Fuchigami | 382/165 |
| 7,349,128 | B2 * | 3/2008 | Hashizume | 358/443 |
| 7,391,543 | B2 * | 6/2008 | Ohara | 358/483 |
| 7,529,003 | B2 * | 5/2009 | Fukawa | 358/505 |
| 2003/0063332 | A1 * | 4/2003 | Sato | 358/474 |
| 2005/0018267 | A1 * | 1/2005 | Ando | 359/198 |
| 2006/0061839 | A1 * | 3/2006 | Hiraoka et al. | 358/498 |
| 2006/0256398 | A1 * | 11/2006 | Ishimaru et al. | 358/461 |
| 2008/0060079 | A1 * | 3/2008 | Shimizu et al. | 726/26 |

FOREIGN PATENT DOCUMENTS

| JP | 09-037039 A | 2/1997 |
|---|---|---|
| JP | 2003-125168 | 4/2003 |

* cited by examiner

*Primary Examiner*—Jerome Grant, II
(74) *Attorney, Agent, or Firm*—Squire, Sanders & Dempsey L.L.P.

(57) ABSTRACT

An image reading apparatus including: a circulating transport path to transport original documents; a first reading section to read images at a first reading position on the original documents; and a second reading section to read images on the original documents at a second reading position, opposing to the first reading position, on the circulating transport path, wherein the second reading section has different reading characteristics from characteristics of the first reading section.

6 Claims, 8 Drawing Sheets

IMAGE READING APPARATUS AND COPYING APPARATUS

CROSS REFERENCE TO RELATED APPLICATION

The present application is based on Japanese Patent Application No. 2005-260423 filed with Japan Patent Office on Sep. 8, 2005, the entire content of which is hereby incorporated by reference.

BACKGROUND OF THE INVENTION

1. Field of the Invention

The present invention relates to an image reading apparatus and a copying apparatus.

2. Description of Related Art

According to differences of original document type or characteristics required for reproduced images, different capabilities are demanded for image reading apparatuses. Image reading apparatuses are proposed that accommodate these various capabilities in a single apparatus.

Patent Document 1, for example, proposes to arrange a color image reading section and a monochrome image reading section along one side of an original document transport path, and to selectively use the image reading sections. Further, Patent Document 2 proposes to arrange each of two reading sections at both sides of the original document transport path, and to selectively use the reading sections, such as, according to which side of the original document carries an image. Namely, either of the two reading sections is selected according with different properties of the original documents or differences of required image data (such as difference of resolving power).

Patent Document 1: Unexamined Japanese Patent Application Publication No. H09-37039

Patent Document 2: Unexamined Japanese Patent Application Publication No. 2003-125168

Since the image reading apparatus disclosed in Patent Document 1 has a structure in which two reading sections are arranged in vicinity along the transport path, the transport section need to become large in size, and is not appropriate for an original transport apparatus which employs an open/close operation for reading document images placed on a glass platen. Particularly, in an image reading apparatus of double sided reading type, in which front/rear side reversing is performed by combinations of a circulating transport path and a switchback transport path, the circulating transport path requires more space due to the structure of Patent Document 1, making such a structure not appropriate for the open/close operation type image reading apparatus.

In the method of Patent Document 2, in cases where two reading sections having different characteristics are selectively used according to properties or purposes of the image, since the first and the second side reading sections respectively serve suitably for specific purposes of the images, a user needs to determine front/rear side of the original document according with the purpose of the image, which is inconvenient for the user.

SUMMARY

Structures reflecting one aspect of the present invention are as follows.

(1) An image reading apparatus including: a circulating transport path to transport original documents; a first reading section to read the images on the original documents; and a second reading section to read the images on the original documents at a position opposing to a reading position of the first reading section on the circulating transport path, wherein the second reading section has different reading characteristics from that of the first reading section.

(2) A copying apparatus comprising: the image reading apparatus described in (1); and an image forming apparatus to form an image on a recording medium based on image data generated by the image reading apparatus.

BRIEF DESCRIPTION OF THE DRAWINGS

Embodiments will now be described, only by way of example, with reference to the accompanying drawings which are meant to be exemplary, not limiting, and wherein like elements numbered alike in several figures, in which.

DETAILED DESCRIPTION OF THE PREFERRED EMBODIMENTS

Embodiments of the present invention will be described below, however, the present invention is not meant to be restricted to these embodiments.

(Copying Apparatus)

Figure 1:
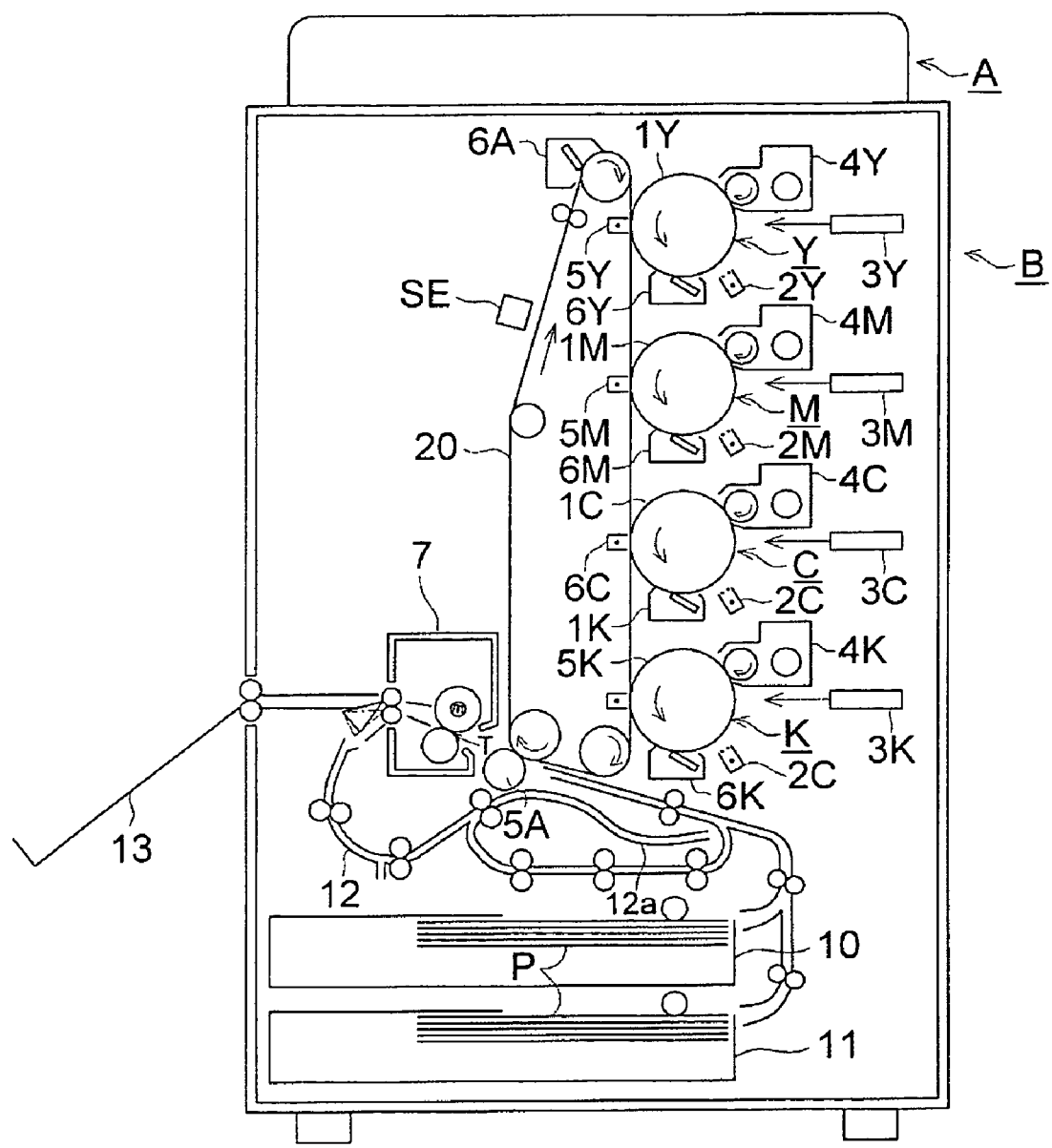
FIG. 1 is an overall diagram of a copying apparatus relating to an embodiment of the present invention.

FIG. 1 shows an overall view of a copying apparatus relating to the embodiment of the present invention.

The copying apparatus includes an image reading apparatus A and an image forming apparatus B.

Image reading apparatus A, as described below, sequentially transports multiple original documents stacked on a sheet supply section, and performs single sided reading, as well as double sided reading to generate image data. Image forming apparatus B forms an image on a recording media based on the image data generated by image reading apparatus B.

Image forming section Y, which forms yellow toner images comprises photoreceptor 1Y as an image forming body, charging unit 2Y, exposing unit 3Y, developing unit 4Y, transfer unit 5Y to perform a first transfer, and cleaning unit 6Y.

Image forming section M, which forms magenta toner images comprises photoreceptor 1M as an image forming body, charging unit 2M, exposing unit 3M, developing unit 4M, transfer unit 5M to perform a first transfer, and cleaning unit 6M.

Image forming section C, which forms cyan toner images comprises photoreceptor 1C as an image forming body, charging unit 2C, exposing unit 3C, developing unit 4C, transfer unit 5C to perform a first transfer, and cleaning unit 6C.

Image forming section K, which forms black toner images comprises photoreceptor 1B as an image forming body, charging unit 2B, exposing unit 3B, developing unit 4B, transfer unit 5B to perform a first transfer, and cleaning unit 6B.

Charging unit 2Y, exposing unit 3Y, and developing unit 4Y; charging unit 2M, exposing unit 3M, and developing unit 4MY; charging unit 2C, exposing unit 3C, and developing unit 4C; as well as charging unit 2K, exposing unit 3K, and developing unit 4K respectively structure image forming sections to form separate color toner images on photoreceptors 1Y, 1M, 1C, and 1K.

In FIG. 1, facing image forming sections Y, M, C, and K, provided is intermediate transfer member 20 which circulates as shown by the arrow mark, transfer unit 5A to perform second transfer is provided downstream of the image forming sections in the moving direction of intermediate transfer member 20, and cleaning unit 6A is provided downstream of transfer unit 5A.

In the lower side, provided are two sheet supply trays 10 and 11 to stack recording media P. Fixing unit 7 is provided downstream of transfer unit 5A in the transport path of recording media P.

In the image forming process to form a recorded image, a yellow toner image is formed by applying charging, exposing and developing onto photoreceptor 1Y, then the yellow toner image is transferred onto intermediate transfer member 20 by transfer unit 5Y. Similarly, a magenta toner image is formed on photoreceptor 1M and is transferred onto intermediate transfer member 20 by transfer unit 5M, a cyan toner image is formed on photoreceptor 1C and is transferred onto intermediate transfer member 20 by transfer unit 5C, and a black toner image is formed on photoreceptor 1K and is transferred onto intermediate transfer member 20 by transfer unit 5K.

Meanwhile, timing of image formation of each single color image of Y, M, C, and K is controlled such that the single color images are superposed on intermediate transfer member 20 to form a multi color image.

The multi color image formed on intermediate transfer member 20 through transfer steps of transfer units 5Y, 5M, 5C, and 5B is transferred onto recording medium P by transfer unit 5A.

The multi color toner image transferred on recording media P is fixed by fixing unit 7, and the fixed image carrying recording medium after fixed is ejected onto exit tray 13.

After transferring, photoreceptors 1Y, 1M, 1C, and 1K, and intermediate transfer member 20 are respectively cleaned by cleaning units 6Y, 6M, 6C, 6K, and 6A.

In a double-sided image forming process, a sheet of recording medium, on which is formed an image on one side by the image forming process described above, proceeds along transport path 12 to be reversed, and after having been reversed it passes through the transfer position of transfer unit 5A, where rear side image is transferred on recording medium P. After the transfer of the rear side image, the recorded image is fixed and the medium is ejected onto exit tray 13.

(Structure of Image Reading Apparatus)

Figure 2:
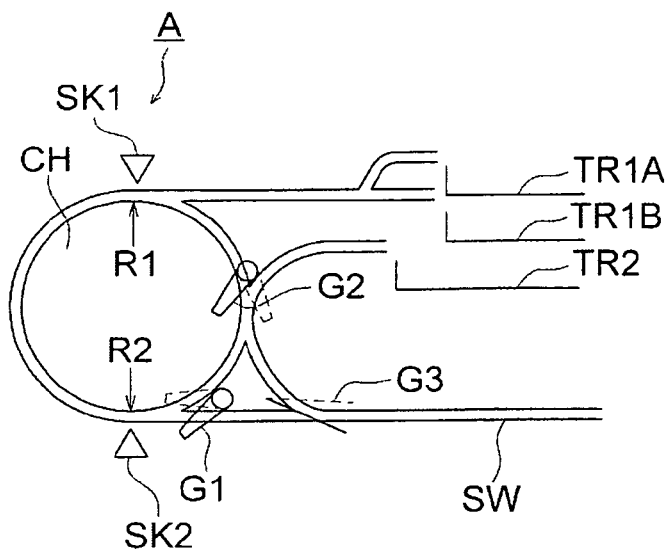
FIG. 2 is a diagram showing a structure of an image reading apparatus relating to an embodiment of the present invention.

FIG. 2 shows a basic structure of the image reading apparatus relating to the embodiment of the present invention.

Image reading apparatus A comprises: sheet supply trays TR1A and TR1B as sheet supplying sections; sheet ejecting tray TR2 as a sheet ejecting section; reading sensor SK1 as a first reading section; reading sensor SK2 as a second reading section; circular transport path CH which is approximately circular and forms a circulating transport path; switchback section SW; gate G1 and gate G2 for switching the transport path; and guide member G3.

Regarding reading sensors SK1 and SK2, used can be a reduction imaging optical system, a CCD reading sensor, a contact sensor incorporating a contact type line sensor or the like, which are conventionally known. Switchback section SW and is structured with a transport path, which reverses the front/rear side of the original document by a switchback operation. Gates G1 and G2 are controlled to switch between the positions indicated by broken and solid lines. Guide member G3 is composed of a plate member biased by a resilient plate member such as a PET film or by a spring, which are normally placed at the positions indicated by solid lines, and displaced to positions indicated by broken lines to guide the original document in a specific path when the original document passes through and pushes against the guide members.

Regarding the circulating transport path to circulate the original document without front/rear side reversing, approximately circular transport path CH (as shown in FIG. 2) is arranged, and reading sensors SK1 and SK2 read images respectively at first and second reading positions R1 and R2 approximately located at opposing positions to each other on circular transport path CH.

Figure 3:
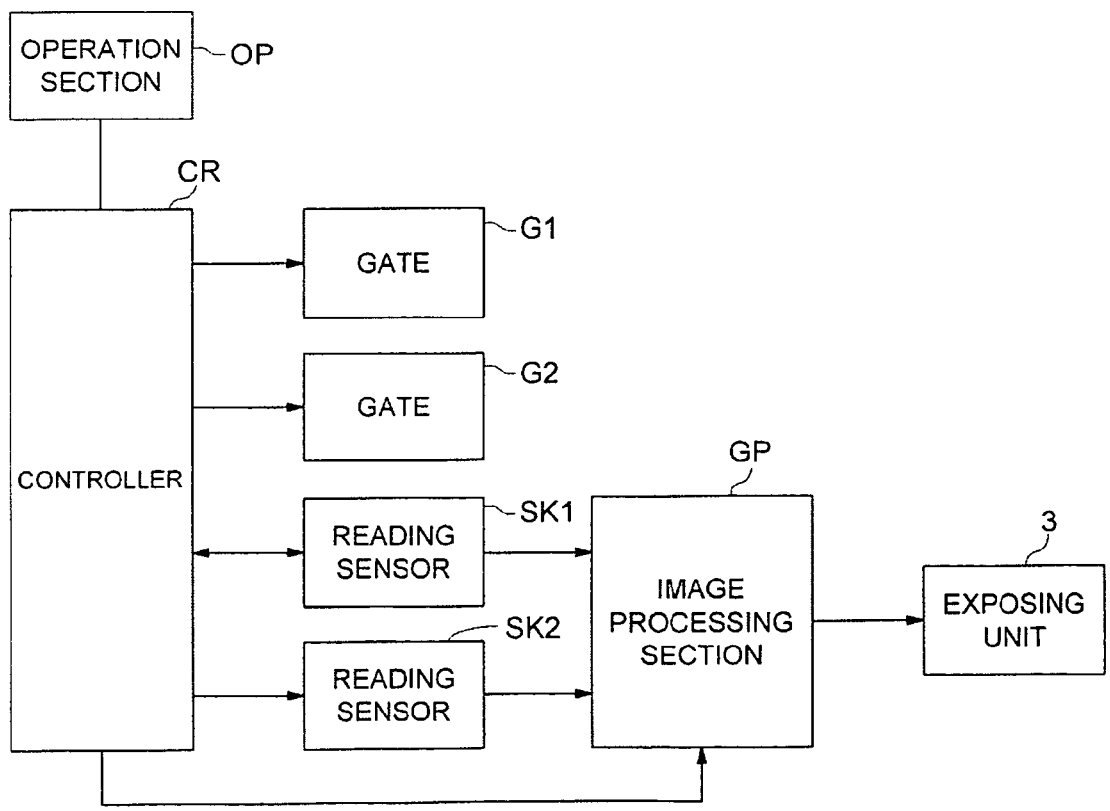
FIG. 3 is a block diagram of a control system in the image reading apparatus shown in FIG. 2.

FIG. 3 is a block diagram of the control system for the image reading apparatus shown in FIG. 2.

Controller CR controls reading sensors SK1 and SK2, gates G1 and G2 to accomplish single sided reading and double sided reading, by utilizing reading sensors SK1 and SK2 as further described below. Controller CR, as also further explained below, accomplishes various modes of image reading according to setting operations of operation section OP or according to the detected types of original documents. Image processing section GP processes image signals from reading sensors SK1 and SK2, and generates image data to control light emission of exposing units 3Y, 3M, 3C and 3K.

Reading sensors SK1 and SK2 have differing characteristics from each other. Specifically, reading sensors SK1 and SK2, sensors having following differing capabilities can be utilized.

(1) Reading sensor Sk1: color sensor to read images as color images. Reading sensor SK2: monochrome sensor to read images as monochrome images.

The color sensor comprises a sensor which outputs image signals corresponding to 3 primary colors BGR, and the monochrome sensor reads images to output image data signals as optical density information. Image processing section GP conducts image processing on the image data signals from reading sensor SK1 to generate yellow image data, magenta image data, cyan image data and black image data, and conducts image processing on the image data signals from reading sensor SK2 to generate monochrome image data.

Whether to perform image processing as a color image or as a monochrome image is determined by whether the original image is a color image or a monochrome image. Whether the original image is a color image or a monochrome image is determined based on setting information at operation section OP, or based on processed results of the data signals read by reading sensor SK1. More specifically, if there are color image data signals in image signals read in a page of original, the original image is determined to be a color original image. According to this method, even in cases where color image exists in only a portion of the image, the image is processed as a color image. In this way, determination of color image or monochrome image is conducted page by page.

Settings for color or monochrome processing at operation section OP may be done either before starting original image reading or after the reading. In cases where the setting is done before the original image reading, the image processing is conducted immediately after the image reading, after while the image forming process can be started. In contrast, in the case where the setting is done after the image reading, even when the original is a color image, whether to output a color image or monochrome image can be determined after confirming the read image which is displayed on operation section OP after the image reading.

Generally, the original document transporting speed during the time of image reading is different for a color image and a monochrome image, where the original document transporting speed for color image reading is lower than that for monochrome image reading. In cases where the setting for a color image or a monochrome image is previously done at operation section OP, the drive motor (not illustrated) for original document transport is controlled to switch the transporting speed based on the setting. Therefore, unnecessarily long image reading time can be avoided in the case of reading a monochrome image.

(2) Reading sensor SK1: high resolution sensor.
    Reading sensor SK2: low resolution sensor.
    Reading sensor SK1 conducts fine image reading with high resolution, and reading sensor SK2 conducts normal resolution reading.

The fine image reading and the normal image reading can be conducted by changing the reading speed. Namely, by previously setting, in operation section OP, the normal image reading or the fine image reading, the reading time for reading the normal image can be made shorter than the reading time for reading the fine image.

Image processing section GP performs different image processing, such as different in gradation, for image data read by the fine image reading and image data read by the normal image reading.

Further in cases where both sensors read a single image, and two read images, a high resolution image and a low resolution image, are displayed on operation section OP, a user can appropriately select either images after confirming the high and low resolution images.

(3) Reading sensor SK1: high sensitive sensor.
    Reading sensor SK2: low sensitive sensor.
    Reading for darker images in whole, such as darker halftone images, high sensitive reading sensor SK1 is used, and for normal images, such as character images in text documents, low sensitive reading sensor SK2 can be used.

Information about whether it is the darker image (high density image) or the normal image is obtained from the setting operation in operation section, or from the data read by reading sensor SK1, at the leading end portion of the original document.

Image processing section GP performs different image processing, such as different in gradation, for image data read by the fine image reading and image data read by the normal image reading.

Further in cases where both sensors read a single image, and two read images, a high density image and a normal image, are displayed on operation section OP, a user can appropriately select either images after confirming the high density image read by reading sensor SK1 and the normal image read by reading sensor SK2.

Embodiment 1

Figure 4:
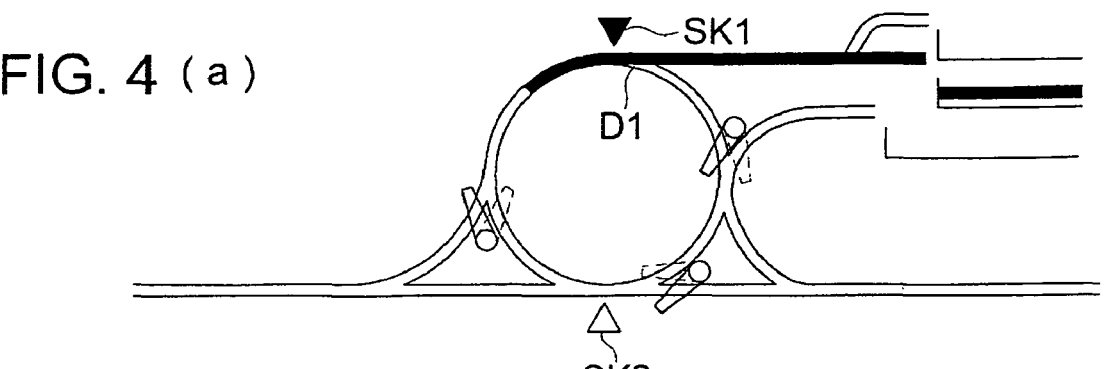
FIGS. 4(a)-4(d) are diagrams showing operations of the image reading apparatus at the time of single sided reading in the first embodiment.
Figure 4:
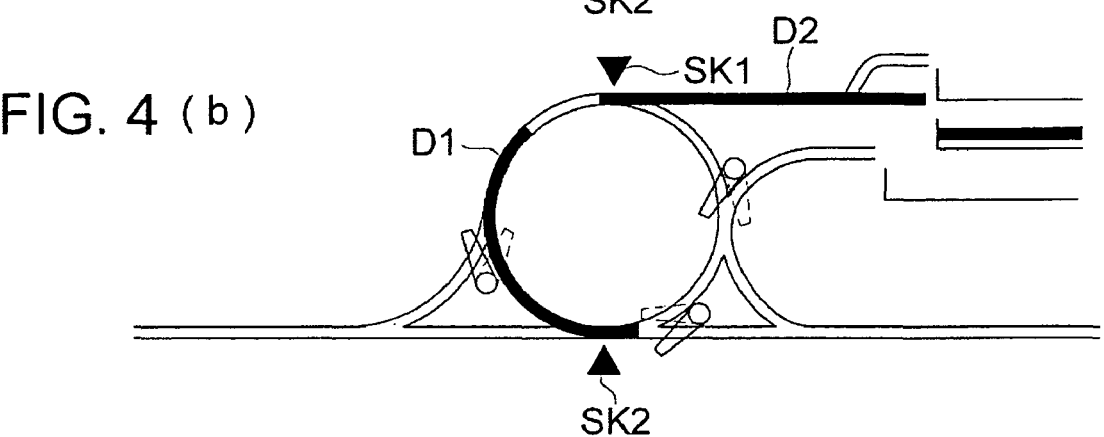
Figure 4:
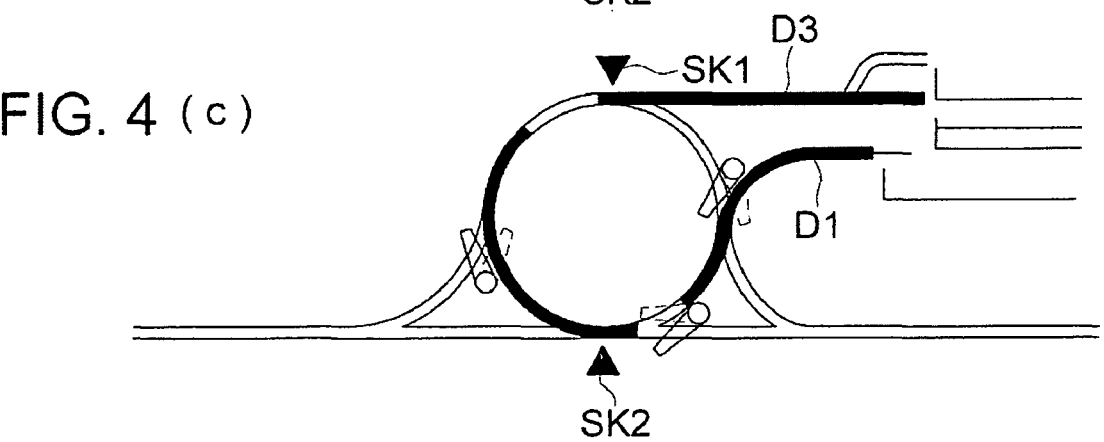
Figure 4:
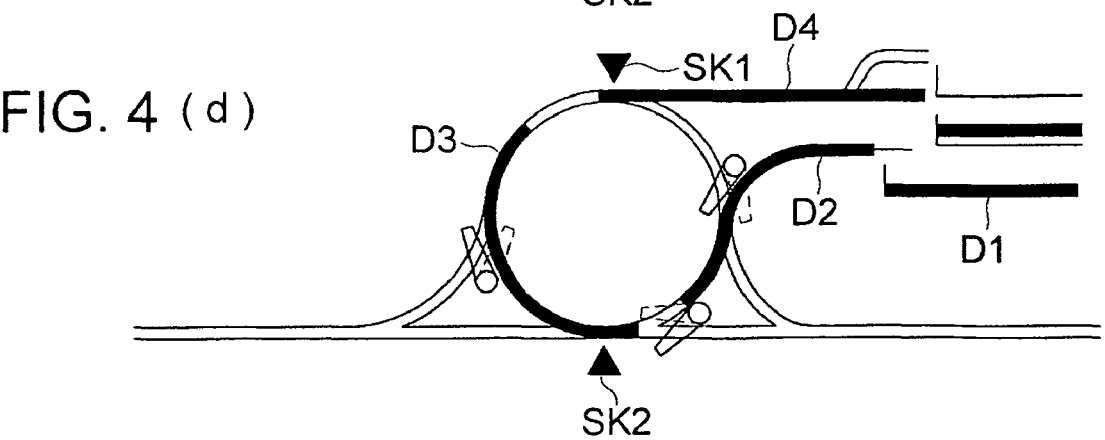
Figure 5:
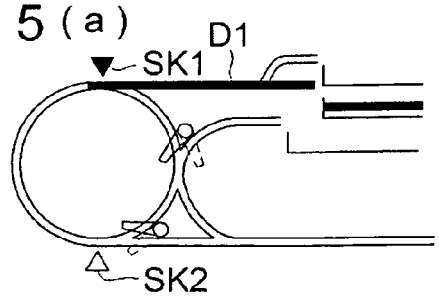
FIGS. 5(a)-5(i) are diagrams showing operations of the image reading apparatus at the time of double sided reading in the first embodiment.
Figure 5:
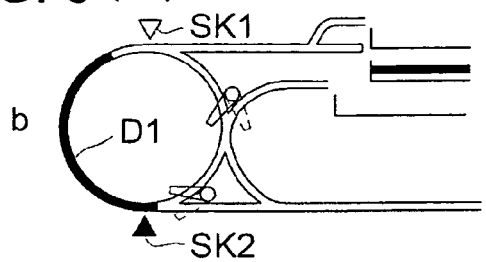
Figure 5:
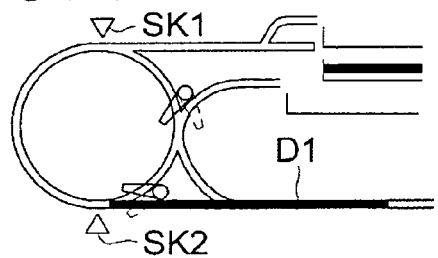
Figure 5:
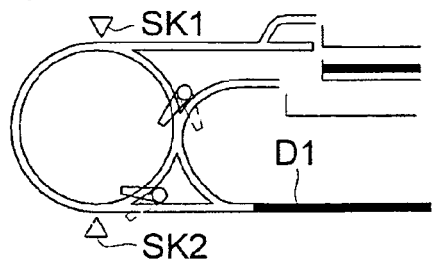
Figure 5:
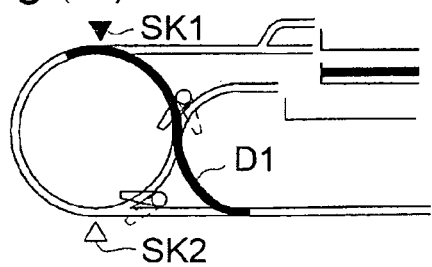
Figure 5:
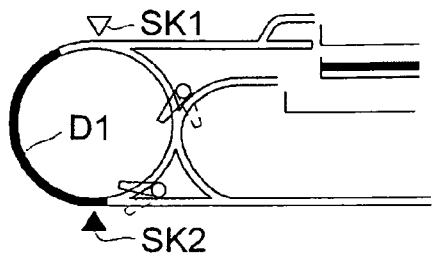
Figure 5:
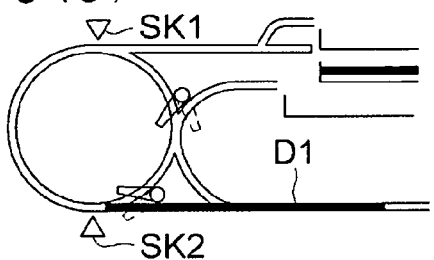
Figure 5:
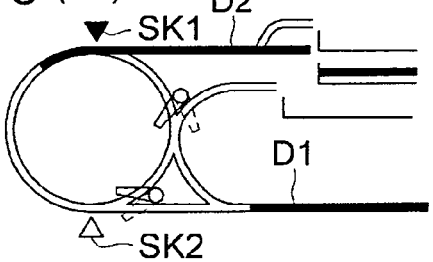
Figure 5:
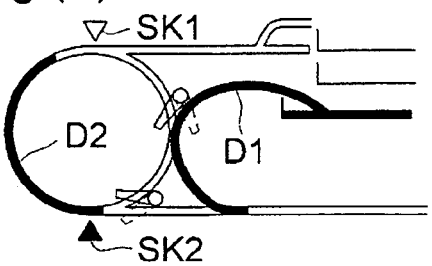
Figure 6:
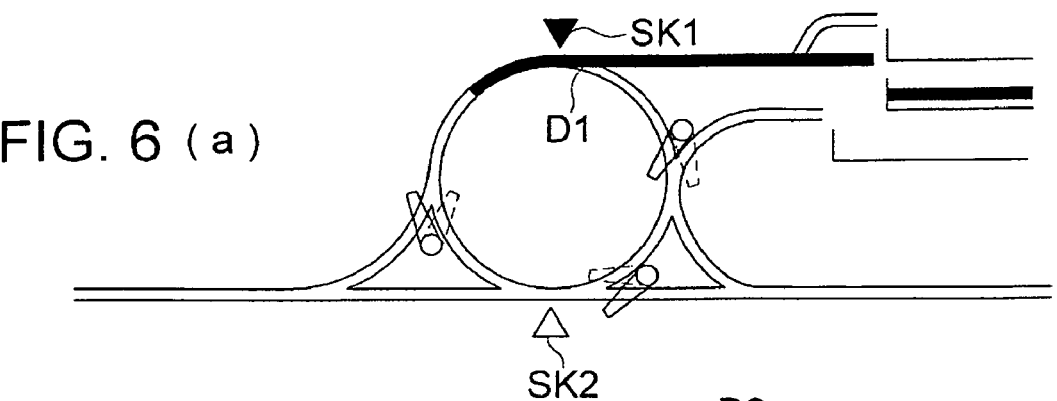
FIGS. 6(a)-6(d) are diagrams showing operations of the image reading apparatus at the time of single sided reading in the second embodiment.
Figure 6:
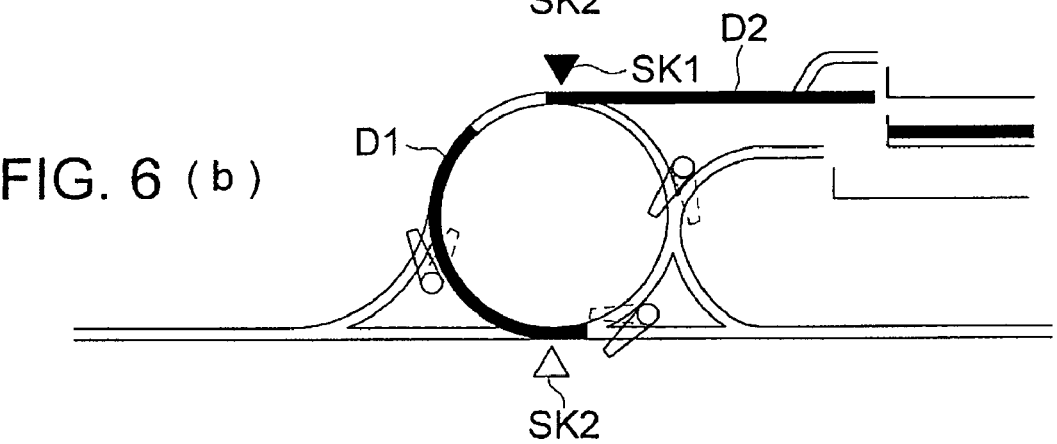
Figure 6:
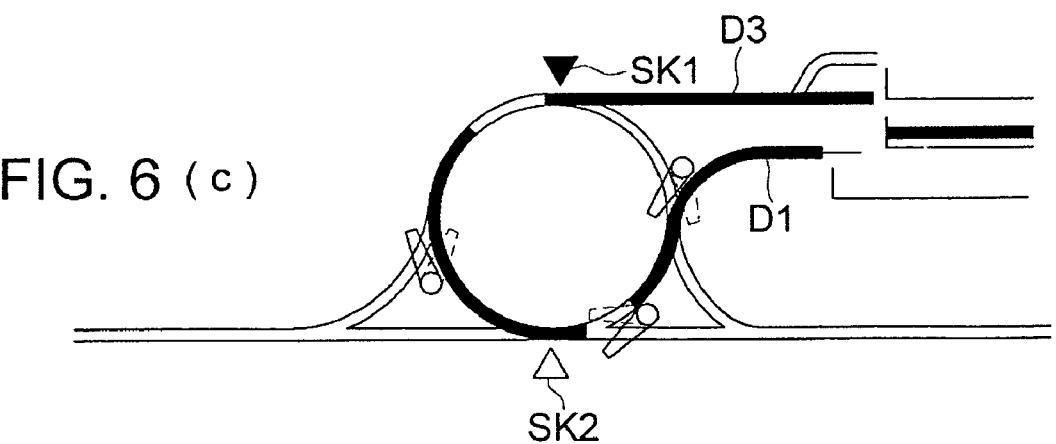
Figure 6:
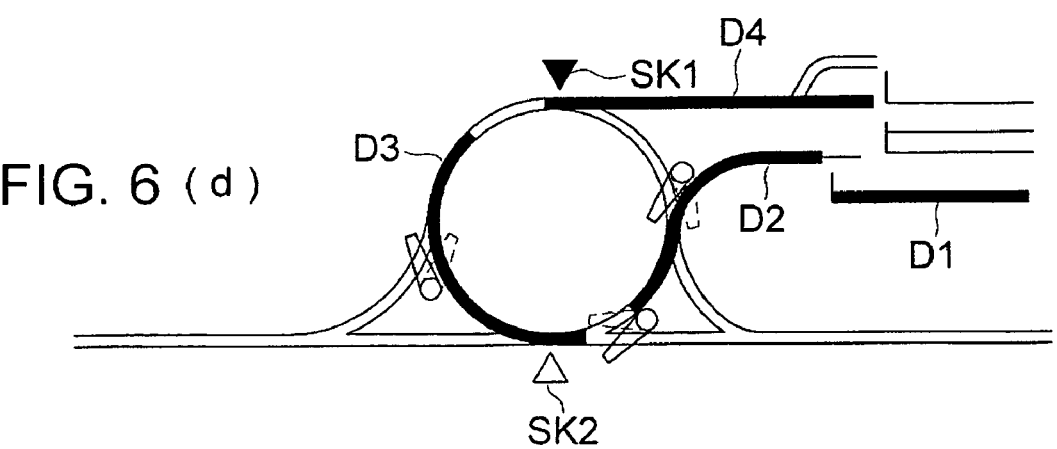
Figure 7:
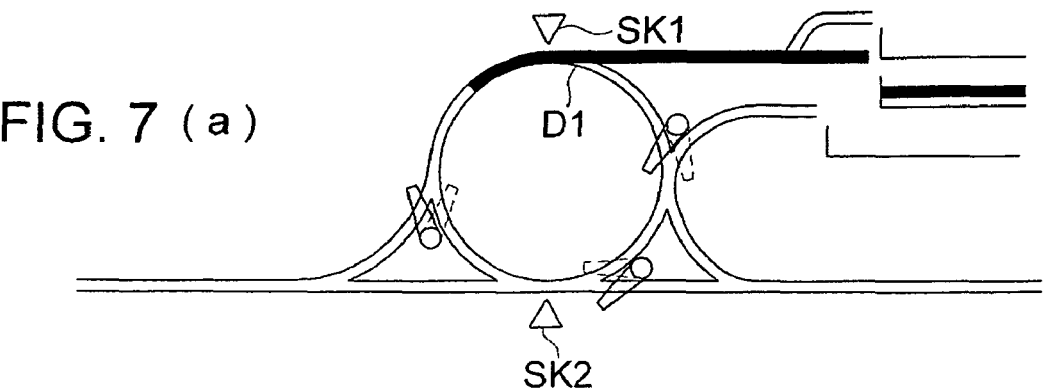
FIGS. 7(a)-7(d) are diagrams showing operations of the image reading apparatus at the time of single sided reading in the second embodiment.
Figure 7:
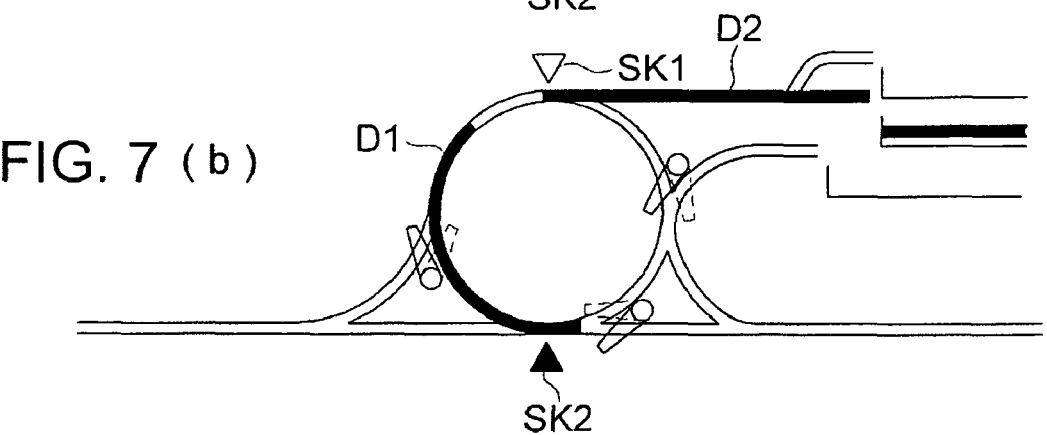
Figure 7:
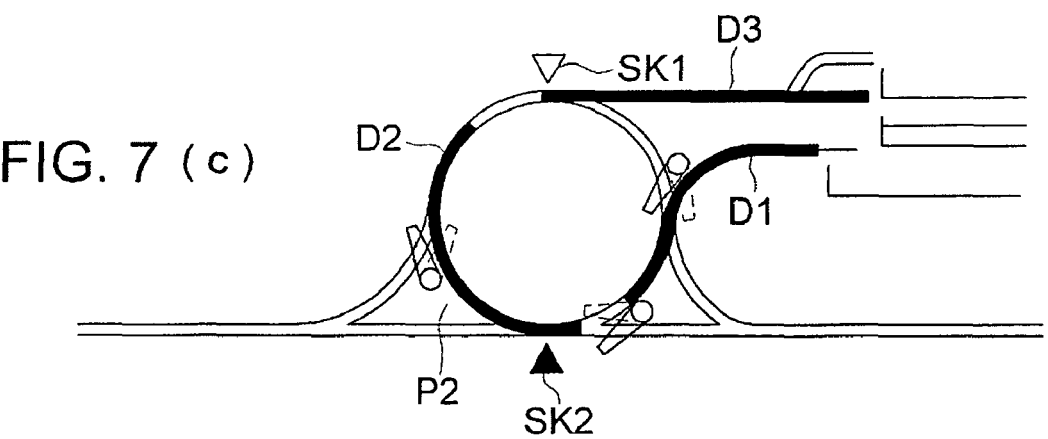
Figure 7:
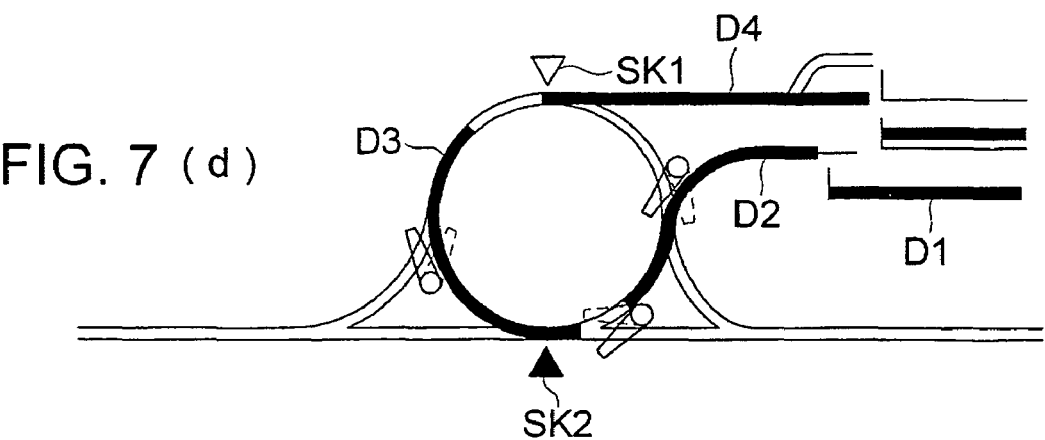

Referring to FIGS. 4 and 5, explained below are operations of single sided reading and double sided reading respectively by reading sensors SK1 and SK2, in cases where reading sensor SK1 is a color sensor and reading sensor SK2 is a monochrome sensor.

In the explanation below, to avoid complication of drawings, the notations shown in FIG. 2 are referred, and in FIGS. 4 and 5 only the reading sensor and the original document are attached with signs. And the reading sensor conducting reading operation is illustrated by a solid triangle mark, and the reading sensor inactivated for reading operation is illustrated by an outline triangle mark.

In this embodiment, the color image reading by reading sensor SK1 and monochrome image reading by reading sensor SK2 are conducted with the same reading speed.

(Single Sided Reading)

As shown in FIGS. 4(a)-4(b), original documents D1 and D2 are sequentially transported, and reading sensors SK1 and SK2 respectively read original document D1 and D2. Namely, in FIGS. 4(a)-4(d), reading sensor SK1 reads original documents D1-D4 and outputs color image data signals, while reading sensor SK2 reads original documents D1-D3 and outputs monochrome image data signals. Timings of image reading, by reading sensors SK1 and SK2, are determined based on length of original documents.

Controller CR selects either an output from reading sensor SK1 or an output from reading sensor SK2 based on information of whether the original image is a color image or a monochrome image, and outputs image data of the image reading apparatus to the outside.

(Double Sided Reading)

Original document D1 passes through first reading position R1, while reading sensor SK1 reads the first side of original document D1 {see FIG. 5(a)}.

Original document D1 proceeds along circular transport path CH, passes through second reading position R2, while reading sensor SK2 reads the first side of original document D1 {see FIG. 5(b)}.

After passing through second reading position, original document D1 is guided by gate G1 to proceeds into switchback section SW {see FIG. 5(c)}, after that, original document D1 is guided by gate G2 to proceed to first reading position R1, and reading sensor SK1 reads the second side of original document D1 {see FIG. 5(e)}.

After the reading of the second side at the first reading position R1, original document D1 proceeds along circular transport path CH, passes through second reading position R2, and reading sensor SK2 reads the second side of original document D1 {see FIG. 5(f)}.

After passing through the second reading position, original document D1 is guided by gate G1 to proceeds into switchback section SW {see FIGS. 5(g), 5(h)}, after that, original document D1 is guided by gate G2 to proceed from switch back section SW to be ejected into exit tray TR2 {see FIG. 5(i)}.

Second original document D2 is transported to first reading position R1 at the timing when first original document D1 proceeds into switchback section SW after the second side has been read {see FIG. 5(h)}.

Regarding original document D2, similarly to the process explained for original document D1, the first and second side reading processes are conducted, and, is ejected into exit tray TR2.

Similarly to the case of single sided reading, controller CR selects either an output from reading sensor SK1 or an output from reading sensor SK2 based on information of whether the original image is a color image or a monochrome image, and outputs image data of the image reading apparatus.

Embodiment 2

Explained below are operations of another example for single sided reading and double sided reading, by reading sensors SK1 and SK2, in cases where reading sensor SK1 is a color sensor and reading sensor SK2 is a monochrome sensor.

In this embodiment, when reading sensor SK1 reads an image on an original document, the original document is transported at low speed, and when reading sensor SK2 reads the image, the original document is transported at high speed.

(Single Sided Reading)

In a low speed reading of color document originals, as shown in FIGS. 6(a)-6(d), original documents D1 and D2 are sequentially transported, and reading sensor SK1 reads the color images. And, in a high speed reading of monochrome original documents D1 and D2, as shown in FIGS. 7(a)-7(d), original documents D1 and D2 are sequentially transported, and reading sensor SK2 reads the monochrome images.

(Double Sided Reading)

Figure 8A:
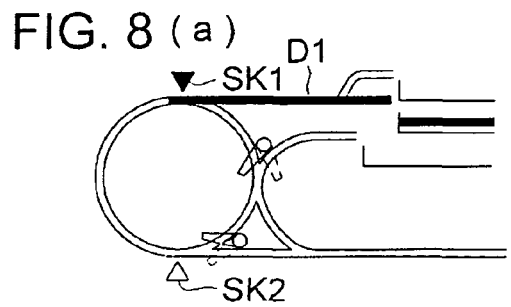
FIGS. 8(a)-8(i) are diagrams showing operations of the image reading apparatus at the time of double sided reading in the second embodiment.
Figure 8B:
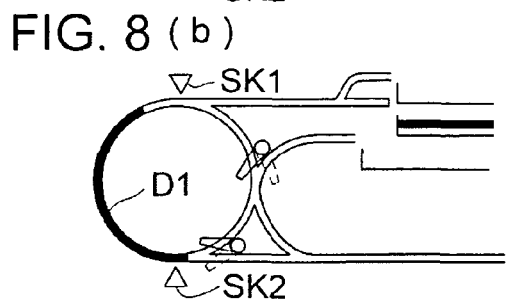
Figure 8C:
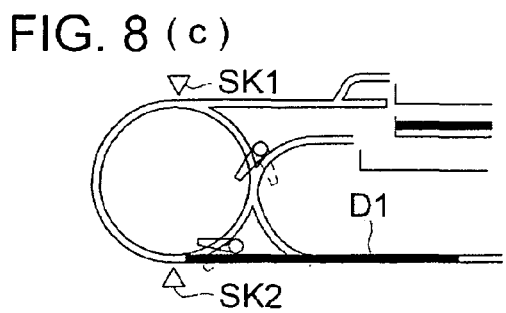
Figure 8D:
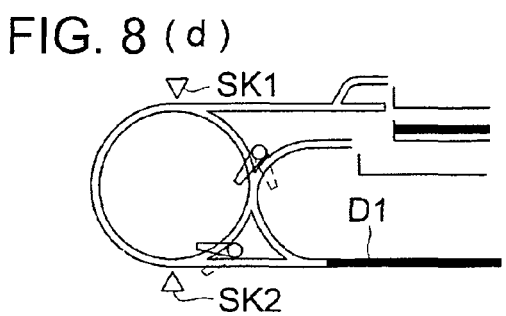
Figure 8E:
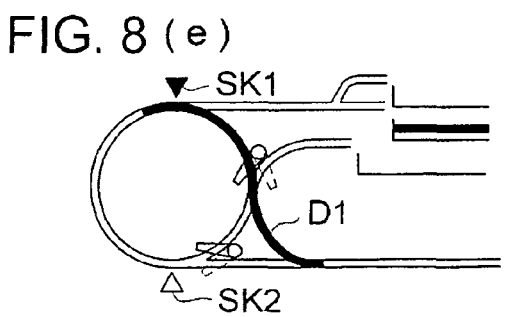
Figure 8F:
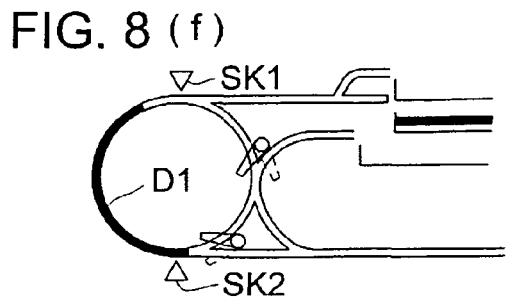
Figure 8G:
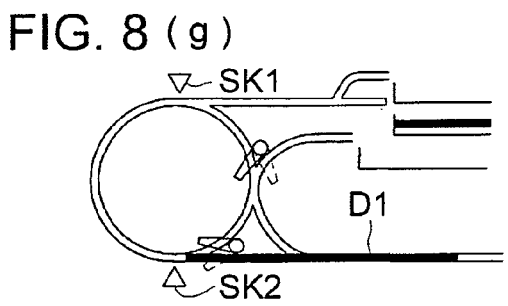
Figure 8H:
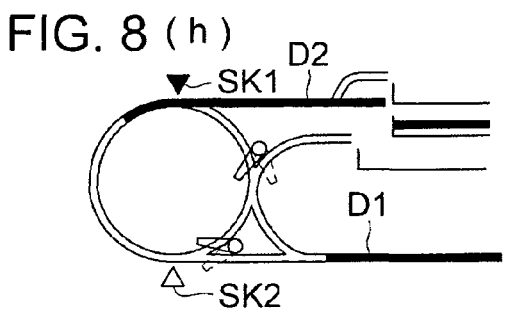
Figure 8I:
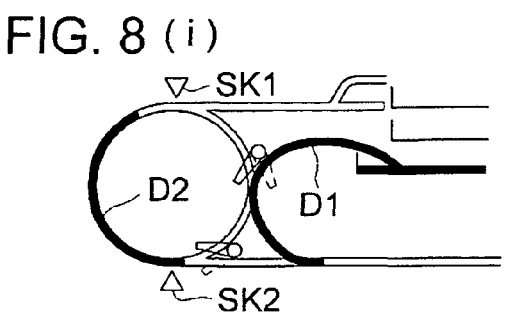
Figure 9A:
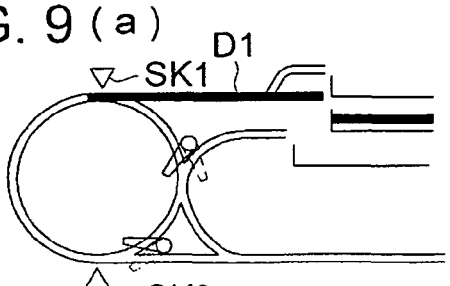
FIGS. 9(a)-9(i) are diagrams showing operations of the image reading apparatus at the time of double sided reading in the second embodiment.
Figure 9B:
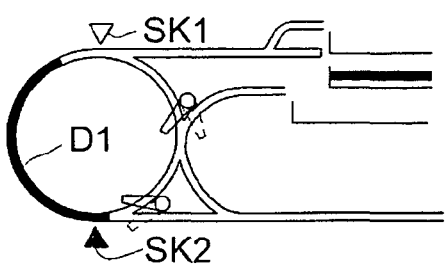
Figure 9C:
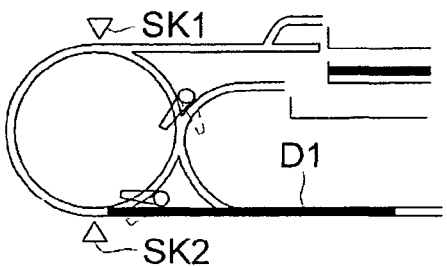
Figure 9D:
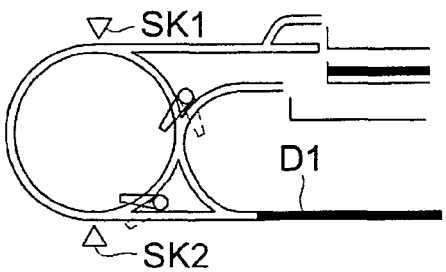
Figure 9E:
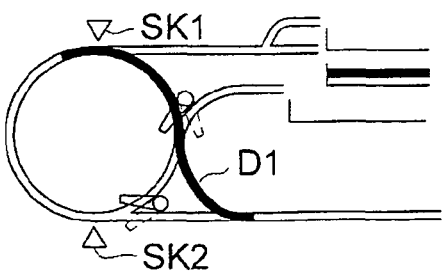
Figure 9F:
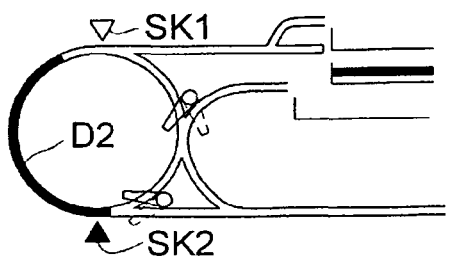
Figure 9G:
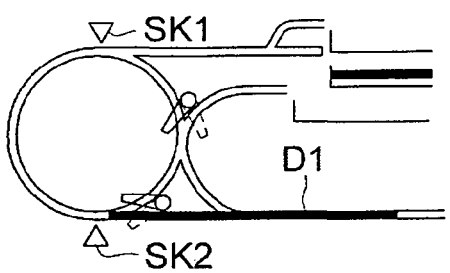
Figure 9H:
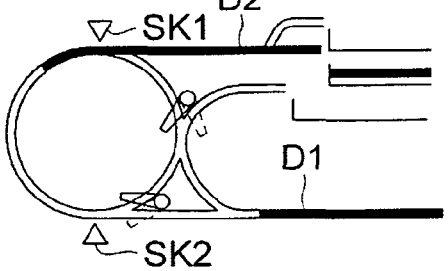
Figure 9I:
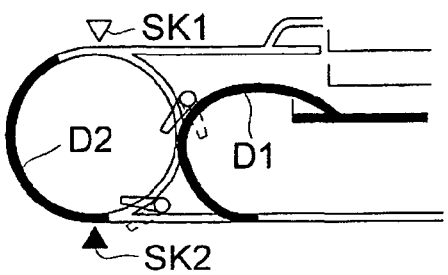

In a low speed reading of color document originals, as shown in FIGS. 8(a)-8(i), original documents D1 and D2 are sequentially transported, and reading sensor SK1 reads the color images {see FIGS. 8(a), 8(e), 8(h)}. And, in a high speed reading of monochrome original documents, as shown in FIGS. 9(a)-9(i), original documents D1 and D2 are sequentially transported, and reading sensor SK2 reads the monochrome images {see FIGS. 9(b), 9(f), 9(i)}.

According to the embodiments described above, by selectively using the reading sections based on difference of original types or intended purpose of the image, multiple functions can be realized. Further in the case of connecting with an image forming apparatus, an image reading apparatus with compact size and easy operation can be realized.

Further a compact sized image reading apparatus capable of double sided reading can be realized.

Furthermore, a copying apparatus having multiple functions can be realized, which is capable of accommodating various types of original documents and various intended purposes

What is claimed is:

1. An image reading apparatus comprising:
   a circulating transport path configured to transport original documents with recirculation, wherein the original documents are transported along a surface of the circulating transport path;
   a first reading section to read images on the original documents at a first reading position on the circulating transport path; and
   a second reading section to read images on the original documents at a second reading position on the circulating transport path, wherein the first reading position and the second reading position are located at the same side of the surface of the circulating transport path; wherein the second reading section has different reading characteristics from characteristics of the first reading section.

2. The image reading apparatus of claim 1, wherein either the first reading section or the second reading section is a color image reading section which reads images on the original documents as color images, and the other is a monochrome image reading section which reads images on the original documents as monochrome images.

3. The image reading apparatus of claim 1, wherein the first reading section and the second reading section respectively have different resolving powers to each other.

4. The image reading apparatus of claim 1, wherein the first reading section and the second reading section respectively have different sensitivities to each other.

5. The image reading apparatus of claim 1, further comprising:
   a switchback section; and
   a gate to switch transport paths,
wherein a single sided reading of the original documents by the use of the first reading section and/or the second reading section, and a double sided reading of the original documents by the use of the first reading section and/or the second reading section are made possible by switching the transport paths through the gate.

6. A copying apparatus comprising:
   the image reading apparatus described in claim 1; and
   an image forming apparatus to form an image on a recording medium based on image data generated by the image reading apparatus.

* * * * *